US010842095B2

(12) United States Patent
Ivanescu et al.

(10) Patent No.: US 10,842,095 B2
(45) Date of Patent: Nov. 24, 2020

(54) HYDROPONICS APPARATUS, SYSTEM AND METHOD

(71) Applicant: Eco Convergence Group, Inc, Orlando, FL (US)

(72) Inventors: Cristian Ivanescu, Orlando, FL (US); Cristian Eugen Toma, Orlando, FL (US); Michael Francis Quigley, Orange City, FL (US)

(73) Assignee: KALERA, INC., Orlando, FL (US)

( * ) Notice: Subject to any disclaimer, the term of this patent is extended or adjusted under 35 U.S.C. 154(b) by 210 days.

(21) Appl. No.: 15/901,323

(22) Filed: Feb. 21, 2018

(65) Prior Publication Data
US 2019/0021249 A1  Jan. 24, 2019

Related U.S. Application Data

(60) Provisional application No. 62/534,157, filed on Jul. 18, 2017.

(51) Int. Cl.
*A01G 31/06* (2006.01)
*A01G 9/04* (2006.01)
(Continued)

(52) U.S. Cl.
CPC ........... *A01G 31/06* (2013.01); *A01G 9/0297* (2018.02); *A01G 9/045* (2013.01); *A01G 9/047* (2013.01);
(Continued)

(58) Field of Classification Search
CPC .... A01G 31/06; A01G 9/0297; A01G 9/0299; A01G 9/045; A01G 9/047
See application file for complete search history.

(56) References Cited

U.S. PATENT DOCUMENTS 2,917,867 A   12/1959  Bailey
3,772,827 A   11/1973  Ware
(Continued)

FOREIGN PATENT DOCUMENTS

| EP | 0043595 B1 | 1/1984 |
| GB | 473279 | 10/1937 |
| WO | 2016182380 | 11/2016 |

OTHER PUBLICATIONS

KE Growair; Greenhouse Air Solutions: Mounting Instructions for Installation of the KE GrowAir® Ducts; Jun. 2015; 4 pages; Netherlands.
(Continued)

*Primary Examiner* — Monica L Barlow
(74) *Attorney, Agent, or Firm* — Greenberg Traurig; Joshua R. Brown; Corinne Lagosh (57) ABSTRACT

Tray assemblies organized in a vertical stack with a grow light positioned above each. Plant nutrient solution flows into a feed reservoir positioned in a first end of the top assembly. When plant nutrient solution reaches the level of outlets positioned in a sidewall of the feed reservoir, it flows into longitudinal channels positioned on the tray assembly. A collection reservoir at a second end of the tray assembly collects excess solution from the channels. A lip positioned between the channels and the collection reservoir retains some of the solution in the channels so it is available to plants held by the tray assembly. Excess solution flows from the collection reservoir of the top tray assembly to a feed reservoir serving the next tray assembly in the stack. The pattern is repeated while alternating the orientation of each tray assembly such that solution is provided to each tray assembly.

12 Claims, 5 Drawing Sheets

(51) Int. Cl.
*A01G 9/20* (2006.01)
*A01G 27/02* (2006.01)
*A01G 9/029* (2018.01)
*A01G 31/00* (2018.01)

(52) U.S. Cl.
CPC .............. *A01G 9/20* (2013.01); *A01G 27/02* (2013.01); *A01G 2031/006* (2013.01)

(56) References Cited

U.S. PATENT DOCUMENTS

| | | | |
|---|---|---|---|
| 3,992,809 A | 11/1976 | Chew | |
| 4,170,844 A | 10/1979 | Steele | |
| 4,189,867 A | 2/1980 | Schneck | |
| 4,248,013 A * | 2/1981 | Allen | A01G 31/02 47/59 R |
| 5,042,196 A | 8/1991 | Lukawski | |
| 5,070,628 A | 12/1991 | Zagar | |
| 5,189,834 A | 3/1993 | Green | |
| 5,502,922 A | 4/1996 | Schlomo | |
| 5,746,653 A | 5/1998 | Palmer et al. | |
| 6,182,394 B1 * | 2/2001 | Bassler | A01G 27/06 47/65.5 |
| 6,243,985 B1 | 6/2001 | Miller | |
| 8,151,518 B2 | 4/2012 | Adams et al. | |
| 8,181,387 B2 | 5/2012 | Loebl et al. | |
| 8,234,812 B1 | 8/2012 | Colless et al. | |
| 8,910,419 B1 | 12/2014 | Oberst | |
| 9,032,664 B2 | 5/2015 | Yusibov et al. | |
| 9,345,207 B2 | 5/2016 | Juncal et al. | |
| 9,834,479 B2 | 12/2017 | Gong et al. | |
| 2007/0213003 A1 | 9/2007 | Railkar et al. | |
| 2009/0260284 A1 * | 10/2009 | Barbalho | A01G 9/033 47/65.9 |
| 2009/0307973 A1 | 12/2009 | Adams et al. | |
| 2010/0031893 A1 | 2/2010 | Bodlovich et al. | |
| 2010/0236150 A1 * | 9/2010 | Masser | A01G 9/045 47/62 C |
| 2011/0296757 A1 | 12/2011 | McGrath | |
| 2012/0144740 A1 | 6/2012 | Igarashi | |
| 2012/0279127 A1 | 11/2012 | Yusibov et al. | |
| 2013/0247462 A1 | 9/2013 | Leslie | |
| 2014/0020292 A1 | 1/2014 | McNamara et al. | |
| 2014/0137471 A1 | 5/2014 | Harwood et al. | |
| 2014/0283452 A1 | 9/2014 | Dittman | |
| 2015/0068121 A1 | 3/2015 | Probst et al. | |
| 2015/0135593 A1 | 5/2015 | Ross et al. | |
| 2015/0230438 A1 | 8/2015 | Barber | |
| 2016/0606048 | 4/2016 | Moghaddam et al. | |
| 2016/0270310 A1 * | 9/2016 | Botman | A01G 22/00 |
| 2016/0316645 A1 | 11/2016 | Neufeld | |
| 2016/0338276 A1 | 11/2016 | Speidell et al. | |
| 2016/0345518 A1 | 12/2016 | Collier et al. | |
| 2017/0049082 A1 | 2/2017 | Kim et al. | |
| 2017/0094920 A1 | 4/2017 | Ellins et al. | |
| 2017/0127629 A1 | 5/2017 | Miyabe et al. | |
| 2018/0007849 A1 * | 1/2018 | Cohen | A01G 31/02 |
| 2018/0092337 A1 * | 4/2018 | Hori | A01K 63/04 |
| 2018/0213735 A1 * | 8/2018 | Vail | A01G 31/06 |
| 2018/0359946 A1 * | 12/2018 | Rossi | A01G 7/045 |
| 2019/0082620 A1 * | 3/2019 | Griffin | A01G 31/06 |

OTHER PUBLICATIONS

United States Searching Authority, International Search Report and Written Opinion dated Jun. 14, 2018 for International PCT Application No. PCT/US2018/018992.

* cited by examiner

HYDROPONICS APPARATUS, SYSTEM AND METHOD

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This disclosure relates to hydroponic plant cultivation.

BRIEF SUMMARY OF THE INVENTION

In an aspect of an embodiment of the invention, a hydroponic system for growing plants is provided comprising one or more stacks of tray assemblies for holding plants. In an embodiment, each stack holds a plurality of tray assemblies organized vertically, and each tray assembly is oriented 180° relative to the orientation of the tray assembly above or below it in the stack. A grow light assembly is positioned above each tray assembly. In embodiments, also provided are: a nutrient reservoir containing an amount of plant nutrient solution; a distribution reservoir having one or more outlets at the bottom, with one outlet providing the plant nutrient solution to each stack; a nutrient pump that directs the plant nutrient solution from the nutrient reservoir to the distribution reservoir by way of an inlet pipe; and an overflow pipe that returns excess liquid from the distribution reservoir back to the nutrient reservoir. In an embodiment, an air flow generation and distribution system is provided comprising a plurality of air flow generation and distribution assemblies wherein each air flow generation and distribution assembly provides air flow to one tray assembly in each stack.

In an embodiment, the plant nutrient solution travels through the outlets on the distribution reservoir gravitationally through a flow restrictor and into a feed reservoir positioned in a first end of the top tray assembly in each stack. In an embodiment, the feed reservoir has an inlet, capable of allowing the plant nutrient solution to flow into the feed reservoir, and one or more outlets positioned on a sidewall of the feed reservoir such that when the plant nutrient solution in the feed reservoir reaches the level of the outlets a portion of the plant nutrient solution flows out of the feed reservoir and into a plurality of longitudinal channels positioned on a top-facing surface of the top tray assembly. In an embodiment, a collection reservoir is positioned at a second end of the top tray assembly, wherein the collection reservoir is configured to collect excess plant nutrient solution from the longitudinal channels positioned on the top tray assembly. In an embodiment, a lip is positioned between the longitudinal channels and the collection reservoir such that at least some of the plant nutrient solution is retained in the longitudinal channels such that the plant nutrient solution is available to the plurality of plants held by the top tray assembly. In an embodiment, a feed pipe is positioned at an outlet of the collection reservoir of the top tray assembly, and the feed pipe is configured to allow the excess plant nutrient solution to flow from the collection reservoir of the top tray assembly to a feed reservoir serving the next tray assembly in the stack. In an embodiment, this pattern is repeated while alternating the orientation of each tray assembly in the stack such that plant nutrient solution is provided to each tray assembly.

In another aspect of an embodiment of the invention, a tray assembly is provided for providing liquid to hydroponically grown plants. In an embodiment, the tray assembly comprises: a tray having a plurality of longitudinal ribs positioned substantially parallel to one another forming one or more longitudinal channels on a top-facing surface of the tray; a feed reservoir positioned at a first end of the longitudinal channels wherein the feed reservoir has an inlet, capable of allowing the liquid to flow into the feed reservoir, and one or more outlets positioned on a sidewall of the feed reservoir such that when the liquid in the feed reservoir reaches the level of the outlets a portion of the liquid flows out of the feed reservoir and into the longitudinal channels; a collection reservoir positioned at a second end of the longitudinal channels capable of collecting the liquid; and a lip positioned between the second end of the longitudinal channels and the collection reservoir such that at least some of the liquid is retained in the longitudinal channels such that the liquid is available to the hydroponically grown plants when the hydroponically grown plants are positioned above the longitudinal channels.

In yet another aspect of an embodiment of the invention, an air flow generation and distribution assembly is provided for use with a hydroponic system for growing plants. In an embodiment, the assembly comprises a plenum having a plurality of air flow openings positioned along its length, wherein each of the air flow openings is configured to provide air flow to the hydroponic system; a first fan positioned at a first end of the plenum; and a second fan positioned at the second end of the plenum, wherein the first fan and the second fan rotate in opposite directions to each other pressurizing the internal area of the plenum through the concerted action of the counter-rotating fans. In an embodiment, the air that escapes the openings expands causing a decrease in the air temperature in the vicinity of the plenum. In an embodiment, the assembly further comprises an actuator configured to cause the plenum to rotate about its longitudinal axis such that the height of the air flow openings is changed in relation to the growing plants.

Further embodiments include methods of growing plants hydroponically using the systems and apparatus described herein.

BRIEF DESCRIPTION OF THE DRAWINGS

Objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention. Although example embodiments are disclosed for the purpose of illustrating the invention, other embodiments will be apparent to a person of skill in the art, in view of this disclosure, without departing from the scope and spirit of the disclosure herein.

DETAILED DESCRIPTION

Reference will now be made in detail to embodiments of the present invention, examples of which are illustrated in the accompanying drawings. The following description and drawings are illustrative and are not to be construed as limiting. Numerous specific details are described to provide a thorough understanding. Nevertheless, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
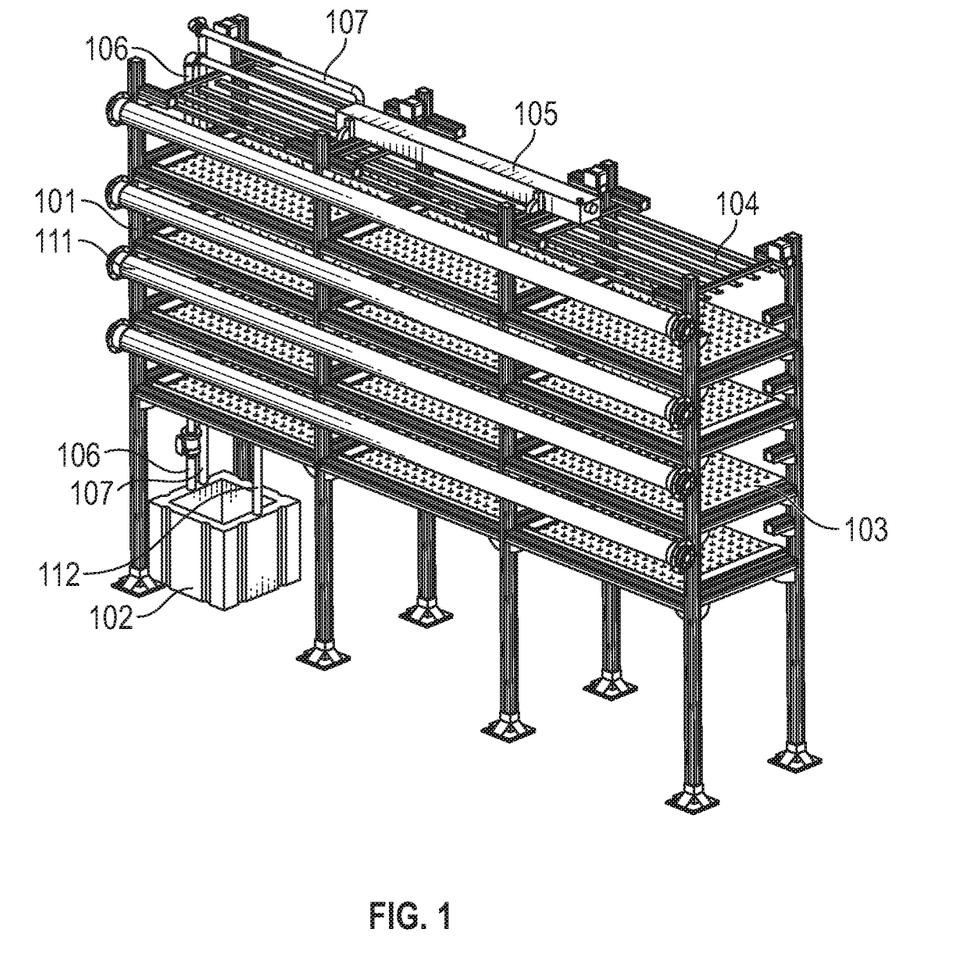
FIG. 1 shows an isometric view of a multi-level, multi-stack hydroponics system in accordance with an embodiment of the present invention.
Figure 2:
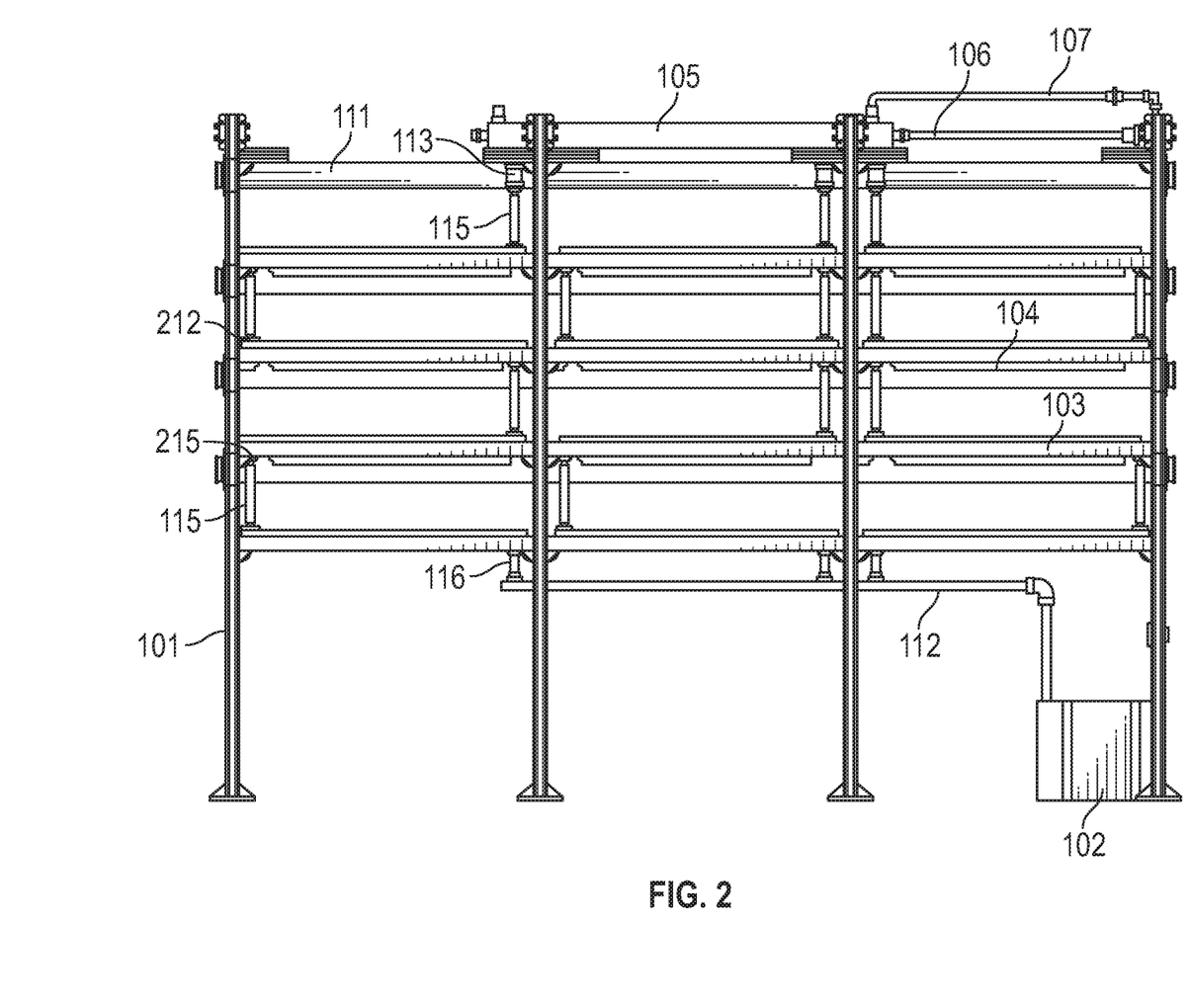
FIG. 2 shows a lateral view of the multi-level, multi-stack hydroponics system shown in FIG. 1.

FIG. 1 shows an isometric view of a multi-level, multi-stack hydroponics system in accordance with an embodiment of the present invention. FIG. 2 shows a lateral view of the multi-level, multi-stack hydroponics system shown in FIG. 1. Although FIGS. 1 and 2 depict a system consisting of three stacks with four levels each, there is no limitation to the number of stacks, nor to the number of levels. The frame 101 provides support to other components of the system. The nutrient tank 102 holds plant nutrient solution. In an embodiment, the plant nutrient solution comprises water. In an embodiment, nutrients can be added to the plant nutrient solution to increase plant yield such as Calcium Nitrate, Ammonium Nitrate, Potassium Nitrate, Iron Chelate, Mono Potassium Phosphate, Magnesium Sulfate, Manganese Sulfate, Boric Acid, Sodium Molybdate, Zinc Sulfate, Copper Sulfate, among others. Not shown in FIGS. 1 and 2 is a nutrient pump whose function is to pump plant nutrient solution from the nutrient tank 102 to the distribution tank 105. The nutrient pump can be a submersible pump inserted in the nutrient tank 102, an external pump installed outside the nutrient tank 102, or another pump technology known in the art. Also not shown in FIGS. 1 and 2 is a plant nutrient solution chiller that maintains the temperature of said liquid at a lower temperature compared to the ambient air temperature. In an embodiment, a lower plant nutrient solution temperature allows for higher dissolved Oxygen levels, with beneficial effects on the health of the plant roots. Also not shown in FIGS. 1 and 2 is an inline sediment filter that prevents sediment accumulated in the nutrient solution from being circulated through the hydraulic system. Also not shown in FIGS. 1 and 2, in an embodiment, an Ozone generating apparatus is provided that injects Ozone gas into the nutrient solution stored inside of the nutrient tank 102 for the purpose of destroying pathogens and algae that may affect the healthy development of plant roots and for the additional benefit of further increasing dissolved Oxygen levels in the plant nutrient solution.

The embodiment of a hydroponic system as shown in FIGS. 1 and 2 comprises of a plurality of stacks laid out horizontally, each holding a plurality of tray assemblies 103 layered vertically. Each tray assembly 103 is configured to hold a plurality of plants. Above each tray assembly 103, there is a grow light assembly 104 comprising one or more grow lights, which provide the light energy required for the plants to develop. The system can accommodate any type of grow light providing an appropriate level of light energy, e.g., LED lights, fluorescent lights, light-emitting plasma lights, organic LED lights, halogen lights, etc.

In an embodiment, the disclosed hydroponic system includes an air flow generation and distribution system that includes one or more of air flow generation and distribution assemblies 111. In an embodiment, as shown in FIGS. 1 and 2, the air flow generation and distribution system includes at least one air flow generation and distribution assembly per layer of the hydroponic system. In an embodiment, an air flow generation and distribution assembly 111 has a plurality of openings allowing for the generation of airflow on the plants growing on the tray assemblies 103. In an embodiment, this airflow removes heat generated by the grow light assemblies 104. In an embodiment, the airflow helps alleviate an undesirable condition named "tip burn", which is actually a Calcium deficiency in the plants. Airflow forces the plants to transpire more, resulting in an increased uptake of nutrients liquid by the plants, including Calcium, which is present as a mineral component of the plant nutrient solution.

FIGS. 1, 2, 3, 4, 5, and 6 provide further insight into the flow of plant nutrient solution through the system in accordance with an embodiment of the present invention. In an embodiment, the plant nutrient solution held in the nutrient tank 102 is pumped up to the distribution tank 105 via the inlet pipe 106. Although the nutrient tank 105 is represented in FIGS. 1 and 2 as having a rectangular section, it can also have a circular section without affecting its function. In an embodiment, when the distribution tank 105 overflows, the overflow pipe 107 returns the excess liquid back to the nutrient tank 102. At its bottom, the distribution tank 105 is equipped with a plurality of outlets. In an embodiment, the distribution tank 105 has an outlet for each stack of vertically layered tray assemblies 103. In an embodiment, each said outlet is equipped with a flow restrictor 113 that allows for regulating the flow of plant nutrient solution through the outlet. In an embodiment, the distribution tank outlets are positioned for each stack of vertically layered tray assemblies 103 such that there is an outlet situated directly above the feed tank 210 of the top most tray assembly 103 in the stack. In an embodiment, a feed pipe 115 connects the output of the flow restrictor 113 to the fitting 214 attached to the removable lid 212 of the tray assembly 103 situated at the top most level, immediately under the flow restrictor 113, allowing for plant nutrient solution to be transferred gravitationally from the distribution tank 105 to the feed tank 210 of the said tray assembly 103. In an embodiment, from the feed tank 210, the plant nutrient solution flows through the tray assembly's longitudinal channels 209, and then collects into the tray assembly's collection tank 215. In an embodiment, from the collection tank 215, the plant nutrient solution flows gravitationally through another feed pipe 115 that connects the fitting 217 situated at the bottom of the collection tank 215 of the tray assembly 103 to the fitting 214 attached to the lid 212 of the tray assembly 103 situated immediately under the said tray assembly 103, allowing for plant nutrient solution to be transferred gravitationally from the collection tank 215 of the higher tray assembly 103 to the feed tank 210 of the lower tray assembly 103. In an embodiment, the lid 212 is removable. The same flow process can be repeated at lower levels.

In an embodiment, as shown in FIGS. 1 and 2, the orientation of the tray assemblies in each vertical stack alternates such that the second tray assembly in the stack is oriented 180 degrees relative to the first tray assembly in the stack, and so forth and so on. In embodiment, this zigzag configuration allows plant nutrient solution to flow from the outlet of the collection tank 215 of the first tray assembly to the inlet of the feed tank 210 of the next tray assembly in the stack, and so forth and so on. Thus, in an embodiment, the plant nutrient solution flows from the top of a stack to the bottom of the stack through vertical feed pipes 115 and horizontal longitudinal channels 209, the latter allowing plants to feed from the plant nutrient solution along the way. In an embodiment, at the bottom most level, the nutrient liquid is collected by collection pipes 116 into a common drain pipe 112 that return the plant nutrient solution to the nutrient tank 102.

Although FIGS. 1 and 2 illustrate an exemplary system having three stacks and four layers per stack, the plant nutrient solution distribution system shown can be easily extended to function with any number of stacks and any number of layers per stack. The length of the nutrient tank 105 can be shortened or extended as appropriate, in order to accommodate a lower or a higher number of stacks, respectively. At the same time, any number of outlets and corresponding flow restrictors 113 can be installed at the bottom of the distribution tank 105, matching the number of stacks in the system. In an embodiment, one outlet per stack is provided, appropriately aligned with the feed tank 210 of the top-most tray assembly 103 of the stack. In an embodiment, accommodating a lower or a higher number of layers per stack is accomplished by specifying the appropriate hydraulic head—i.e., the maximum lifting height—for the pump that lifts plant nutrient solution from the nutrient tank 102 to the distribution tank 105.

Figure 3:
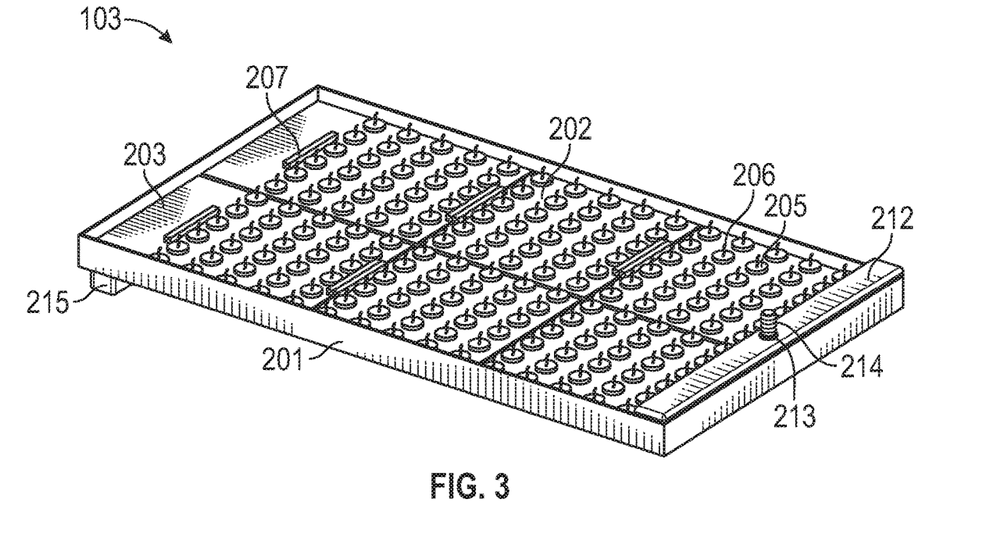
FIG. 3 shows an isometric view of a tray assembly in accordance with an embodiment of the present invention.
Figure 4:
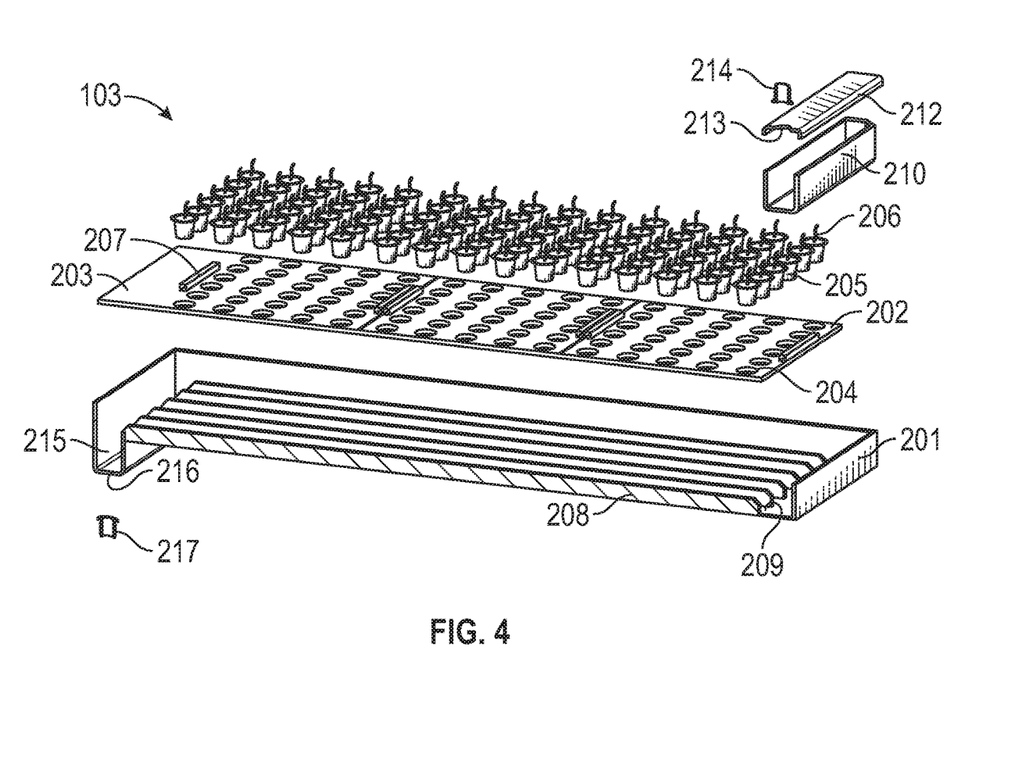
FIG. 4 shows an exploded view of a section taken along the longitudinal axis of the tray assembly shown in FIG. 3.

FIG. 3 shows an isometric view of the tray assembly 103 in accordance with an embodiment of the present invention. FIG. 4 shows an exploded view of a section taken along the longitudinal axis of tray assembly 103 of FIG. 3. In an embodiment, the tray assembly 103 comprises a rectangular tray 201 and a plurality of rectangular plates 202 and 203, each being equipped with a plurality of openings 204 allowing for the insertion of grow media plugs 205 that hold plants 206. Each grow media plug 205 can be either inserted directly into an opening 204, or alternatively can be inserted first into a holder or basket—not pictured in FIGS. 3, 4, 5, and 6—then the holder or basket containing the grow media plug 205 and the plant 206 are inserted together in an opening 204. Although the openings 204 are depicted as circular in FIGS. 3, 4, 5, and 6, they can also be rectangular, triangular, or five or more sides. The spacing between the openings 204 can be adjusted to the size of the plants being grown, larger plants requiring a larger spacing between openings. In an embodiment, each plate 202 and 203 is equipped with tubular plate holders 207 allowing for a robotic or manual lifting device to slide into the tube(s) to lift the plates 202 or 203 individually, and place them on or remove them from the tray 201. In an embodiment, two or more plate holders 207 are attached to the plates 202 or 203 to allow the lifting device to maintain the plates in a substantially level orientation while moving the plates. Although the plate holders 207 are depicted as having a rectangular cross-section in FIGS. 3 and 4, they can have a circular or other cross-section. Although FIGS. 3 and 4 depict an assembly having four 202 plates and two 203 plates, any number of rectangular plates can be used. In an embodiment, the plates 202 or 203 cover a substantial area of the rectangular tray 201. In an embodiment, a portion of the plate 203 covers the top of a collection reservoir 215.

Figure 5:
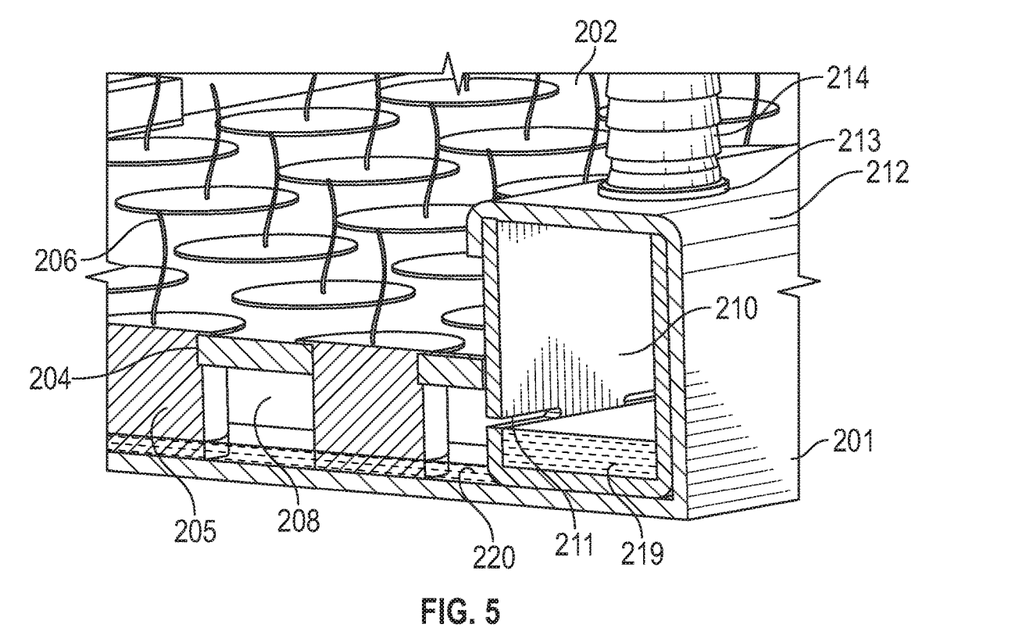
FIG. 5 shows a detail from a section taken along the longitudinal axis of the tray assembly shown in FIG. 3.
Figure 6:
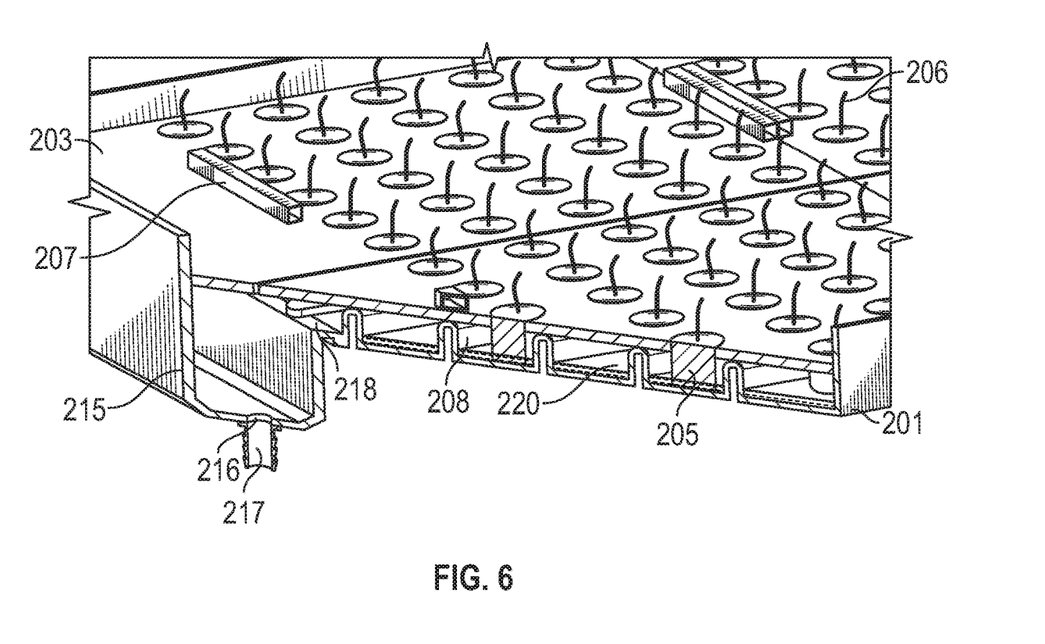
FIG. 6 depicts a detail from a diagonal section of the tray assembly shown in FIG. 3.

In an embodiment, the tray 201 comprises a plurality of longitudinal ribs 208 that create one or more longitudinal channels 209. The longitudinal channels 209 are designed to hold plant nutrient solution. In an embodiment, as shown in FIGS. 5 and 6, the plates 202 and 203 are placed directly on top of the longitudinal ribs 208. In an embodiment, the spacing between the ribs 208 is coordinated with the spacing between the openings 204 such that when the plates 202 and 203 are lowered onto the longitudinal ribs 208, the grow media plugs 205 are inserted into the longitudinal channels 209 such that they become immersed into the plant nutrient solution existing in the longitudinal channels 209.

In an embodiment, any of the plates 202 and 203 can be placed on or removed—either robotically or manually—from the top of the longitudinal ribs 208 without requiring interrupting the circulation of the plant nutrient solution through the system, or without interrupting any aspect of the normal operation of the system.

In an embodiment, the tray assembly 103 further includes a feed tank 210 that is covered with a removable lid 212, which is equipped with an inlet opening 213 allowing for the flow of plant nutrient solution into the feed tank 210 gravitationally from a tank situated immediately above, either from a collection tank 215 or a distribution tank 105—the latter in the case when the tray is placed at the topmost level, as illustrated in FIGS. 1 and 2. In an embodiment, the fitting 214 is placed inside the inlet opening 213 allowing for attaching piping or tubing. FIGS. 3, 4, 5, and 6 depict a barbed fitting. However, any type of fitting that allows for the removal of the tubing or piping for maintenance and cleaning purposes is appropriate for use with the present invention.

In an embodiment, the feed tank 210 is further comprises a plurality of openings 211 that are dimensioned and spaced in coordination with the longitudinal channels 209 in order to allow for the transfer of plant nutrient solution from the feed tank 210 to the longitudinal channels 209. In an embodiment, There is at least one 211 opening per longitudinal channel 209. In an embodiment, the openings 211 are placed at a sufficient height measured from the bottom of the feed tank 210, such that the portion of the wall of the feed tank 210 situated underneath the openings 211 creates a dam that allows the longitudinal channels 209 to store some amount of plant nutrient solution. In an embodiment, at the opposite end from the feed tank 210 the tray 201 is equipped with a lip 218 whose height is coordinated with the vertical position of the openings 211. In this way, each longitudinal channel 209 can retain a layer of plant nutrient solution having a depth determined by the height of the lip 218. The details of the plant nutrient solution retention design are further illustrated in FIG. 5 and FIG. 6. The plant nutrient solution that overflows the lip 218 is collected in the collection tank 215. In an embodiment, the collection tank 215 further comprises an outlet opening 216 allowing the plant nutrient solution to flow gravitationally to a tank situated immediately underneath—either a feed tank 210 or a nutrient tank 102—the latter in the case when the tray is placed at the bottommost level, as illustrated in FIGS. 1 and 2. In an embodiment, a fitting 217 is placed inside the outlet opening 216 allowing for attaching piping or tubing. FIGS. 3, 4, 5, and 6 depict a barbed fitting; however, any type of fitting that allows for the removal of the tubing or piping for maintenance and cleaning purposes is appropriate.

In an embodiment, an important consideration in the design of the tray assembly 103 is the fact that when plant nutrient solution is exposed to light it provides a favorable environment for unwanted algae growth. Small amounts of algae growth are not considered to be detrimental. But abundant algae growth can provide a favorable medium for the development of detrimental fungi that attack plant roots. In various embodiments of the present invention, the following features reduce exposure of the plant nutrient solution to direct light: i) a lid 212 can cover the feed tank 210, ii) the plates 202 and 203 can be configured to cover a substantial area of the rectangular tray 201, and iii) plate 203 can include an extension that does not have any openings 204 and covers the top of the collection tank 215 in order to protect the plant nutrient solution from being exposed to direct light.

FIGS. 5 and 6 provide more detail regarding the longitudinal channels 209. FIG. 5 shows a detail from a section taken along the longitudinal axis of the tray assembly 103. FIG. 6 shows a detail from a diagonal section of the tray assembly 103. In an embodiment, the feed tank 210 is placed inside the tray 201 and captures plant nutrient solution 219 entering through the inlet opening 213. As the plant nutrient solution level inside the feed tank 210 rises it eventually reaches the openings 211 and flows into the longitudinal channels 209 that are separated from each other by the longitudinal ribs 208. In the embodiment shown in FIGS. 5 and 6, the grow media plugs 205 that hold the plants 206 are immersed in the plant nutrient solution 220 that has accumulated inside the longitudinal channels 209. In an embodiment, the height of the lip 218 is coordinated with the vertical position of the openings 211. In an embodiment, the lip 218 creates a dam that together with the wall of the feed tank 210 and the longitudinal ribs 208 retain a layer of plant nutrient solution 220 inside the longitudinal channels 209. Not depicted in FIG. 6 is the situation when the flow of plant nutrient solution incoming through the openings 211 is such that the level of plant nutrient solution 220 inside the longitudinal channels 209 rises above the top of the lip 218. In an embodiment, when the plant nutrient solution 220 rises above the top of the lip 218, the plant nutrient solution 220 overflows into the collection tank 215, then flows out of the collection tank 215 through the outlet opening 216.

In some embodiments of the present invention, the design of the tray assembly 103 has several distinctive benefits related to the fact that the longitudinal channels 209 retain a layer of plant nutrient solution that the plants 206 can feed on: i) the pump that lifts the plant nutrient solution from the nutrient tank 102 to the distribution tank 105 does not need to operate continuously—instead, it needs to be turned on only when the plant nutrient solution 220 held in the longitudinal channels 209 needs to be refreshed due to the dissolved nutrient level becoming too low from uptake by the plants 206 (intermitted pump operation thus can leads to reduced energy consumption); ii) the plants 206 are able to survive in the case of a power outage, or during maintenance or repair shut-downs because they continue to be fed from the plant nutrient solution 220 retained in the longitudinal channels 209.

Figure 7:
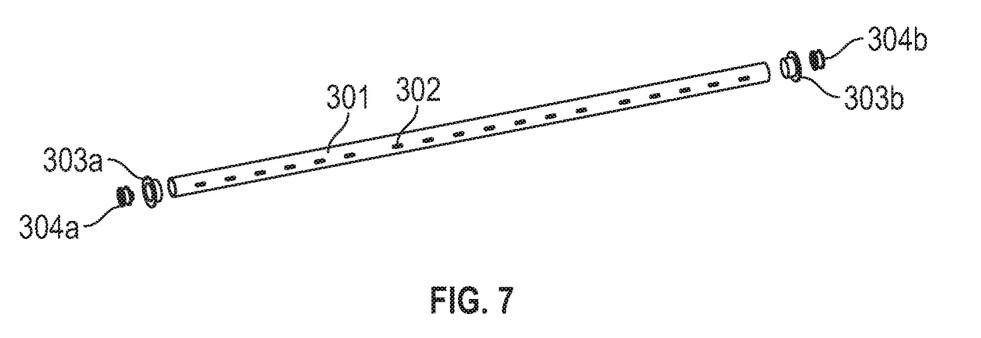
FIG. 7 shows an exploded view of an air flow generation and distribution assembly in accordance with an embodiment of the present invention.
Figure 8:
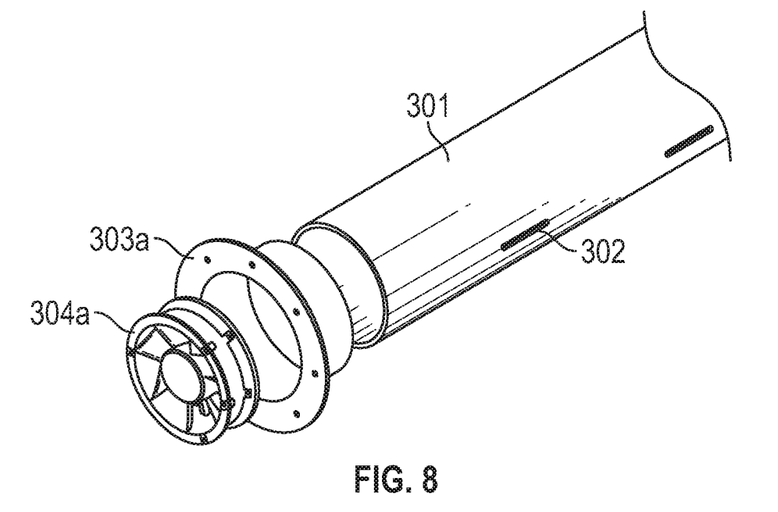
FIG. 8 shows a detail from the exploded view shown in FIG. 7.

FIG. 7 is an exploded view of one of the air flow generation and distribution assemblies 111, comprising a plenum 301, equipped with a plurality of openings 302, and with fans 304a and 304b each attached to an end of the plenum 301 by means of the flanges 303a and 303b, respectively. In an embodiment, the fans 304a and 304b rotate in directions counter to each other such that they both pump air into the plenum from their respective ends. The air inside the plenum can then escape out through the openings 302 in the direction of the plants. FIG. 8 shows a detail from the exploded view shown in FIG. 7. In an embodiment, the plenum 301 and the two flanges 303a and 303b are made from lightweight plastic.

Not shown in FIGS. 7 and 8 is a voltage control device that can be used in an embodiment of the air flow generation and distribution assembly 111 to control the rotational speed of the fans 304a and 304b allowing for adjusting the volumetric flow of air going into the plenum 301, and as a result, for adjusting the volumetric air flow coming out of the plenum 301 through the openings 302, and onto the plants.

Also not shown in FIGS. 7 and 8 is in an embodiment of the air flow generation and distribution assembly 111 further comprising an actuator configured to cause the plenum to rotate about its longitudinal axis such that the height of the air flow openings is changed in relation to the growing plants. In an embodiment, an additional flange is affixed on the plenum 301, and a linear motor, air cylinder, jacking motor, or other actuator is provided whose one end is attached to the additional flange and the other end to a structural member of the frame 101. The actuator can move up and down causing the plenum 301 to rotate, and therefore causing the openings 302 to rotate about the longitudinal axis of the plenum 301, causing the height of the air flow exiting the openings 302 to be adjusted in relation to the plants. Alternatively, the rotational motion of the plenum 301 can be implemented with a rotating motor and a gear system or a friction disk system connecting the additional flange to the axle of the rotating motor. The rotation of the plenum 301 can be performed occasionally for slight adjustments of the height of the air flow exiting openings 302, or alternatively, the plenum 301 can be rotated back and forth in a continuous oscillatory pattern, causing the air flow exiting openings 302 to oscillate across the plants.

In an embodiment of the present invention, the air flow generation and distribution system has the ability to cool down the plants. In an embodiment, in addition to blowing away the hot air produced by the growing lights 104, this system cools down the air as it comes out of the openings 302. In an embodiment, by pressurizing the internal area of the plenum 301 through the concerted action of the counter-rotating fans 304a and 304b, the air that escapes the openings 302 expands, causing a decrease in the air temperature in the vicinity of the plenum 301. In an embodiment, the decreased air temperature leads to reduced energy consumption for air conditioning of the grow room.

In an embodiment, the simplicity of the air flow generation and distribution system allows for optimizing the air flow for any growing situation. As plants grow, the air flow can be adjusted so that the optimized flow helps create an optimized microenvironment around the plants, in terms of temperature and humidity levels. If more air flow is needed, higher output fans 304a and 304b can be used, as well as changing the plenum tube 301 for one with larger or smaller openings 302. In an embodiment, the design allows for quick changes and adjustments that can be perfected to achieve higher plant production yields.

In an embodiment, the air flow generation and distribution system can be automated or set in a recipe for specific plants or crop varieties. In an embodiment not shown, sensors are provided that monitor the plant area and when the sensors detect a change in the perfect flow pattern, the plenum 301 can be automatically rotated as previously described to change the airflow pattern without any human intervention. In this way, as the plants grow, or if there are any changes in the environment's temperature or humidity, the air flow reaching the plants can be varied to improve the environment for plant growth.

The above embodiments are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A tray assembly for providing a liquid to hydroponically grown plants comprising:
    a tray having a plurality of longitudinal ribs positioned substantially parallel to one another forming one or more longitudinal channels on a top-facing surface of the tray;
    a feed reservoir positioned at a first end of the longitudinal channels wherein the feed reservoir has an inlet, capable of allowing the liquid to flow into the feed reservoir, and one or more outlets positioned on a sidewall of the feed reservoir such that when the liquid in the feed reservoir reaches the level of the outlets a portion of the liquid flows out of the feed reservoir and into the longitudinal channels;
    a collection reservoir positioned at a second end of the longitudinal channels capable of collecting the liquid; and
    a lip positioned between the second end of the longitudinal channels and the collection reservoir such that at least some of the liquid is retained in the longitudinal channels such that the liquid is available to the hydroponically grown plants when the hydroponically grown plants are positioned above the longitudinal channels.

2. The tray assembly of claim 1, wherein the liquid is a plant nutrient solution.

3. The tray assembly of claim 1, wherein the one or more outlets positioned on the sidewall of the feed reservoir comprise one or more slots in the sidewall of the feed reservoir.

4. The tray assembly of claim 1, wherein each of the one or more outlets positioned on the sidewall of the feed reservoir corresponds to one of the one or more longitudinal channels and the one or more outlets are spaced such that each of the one of more outlets is capable of providing the liquid to one of the one or more longitudinal channels.

5. The tray assembly of claim 1, further comprising one or more plates having a plurality of openings each capable of holding one of the hydroponically grown plants.

6. The tray assembly of claim 5, wherein each of the openings is configured to accept a grow media plug comprising one of the hydroponically grown plants.

7. The tray assembly of claim 6, wherein the plates are positioned on top of the longitudinal ribs and such that, when the grow media plugs housing the hydroponically grown plants are placed in the openings and the liquid is present in the longitudinal channels, the grow media plugs are in contact with the liquid.

8. The tray assembly of claim 5, wherein each of the plates further comprises two tubular plate holders configured to allow a lifting device to slide into the tubular plate holders to allow lifting of the plates.

9. The tray assembly of claim 7, wherein a portion of at least one of the plates covers the collection reservoir when the at least one of the plates is positioned on top of the longitudinal ribs.

10. The tray assembly of claim 1, wherein the feed reservoir has a removeable lid that covers the liquid when present in the feed reservoir.

11. The tray assembly of claim 1, wherein the height of the lip at the second end of the longitudinal channels coordinates with the height of the outlets positioned on the sidewall of the feed reservoir.

12. The tray assembly of claim 1, wherein the collection reservoir has an outlet capable of allowing the liquid to flow out of the collection reservoir.

* * * * *